July 31, 1962   A. I. STIEBEL ET AL   3,047,116
SAFETY DEVICE FOR POWER PRESSES
Filed Aug. 27, 1958   3 Sheets-Sheet 1

INVENTORS
ARIEL I. STIEBEL
MILES G. RIGBY
BY Strauch, Nolan & Neale
ATTORNEYS

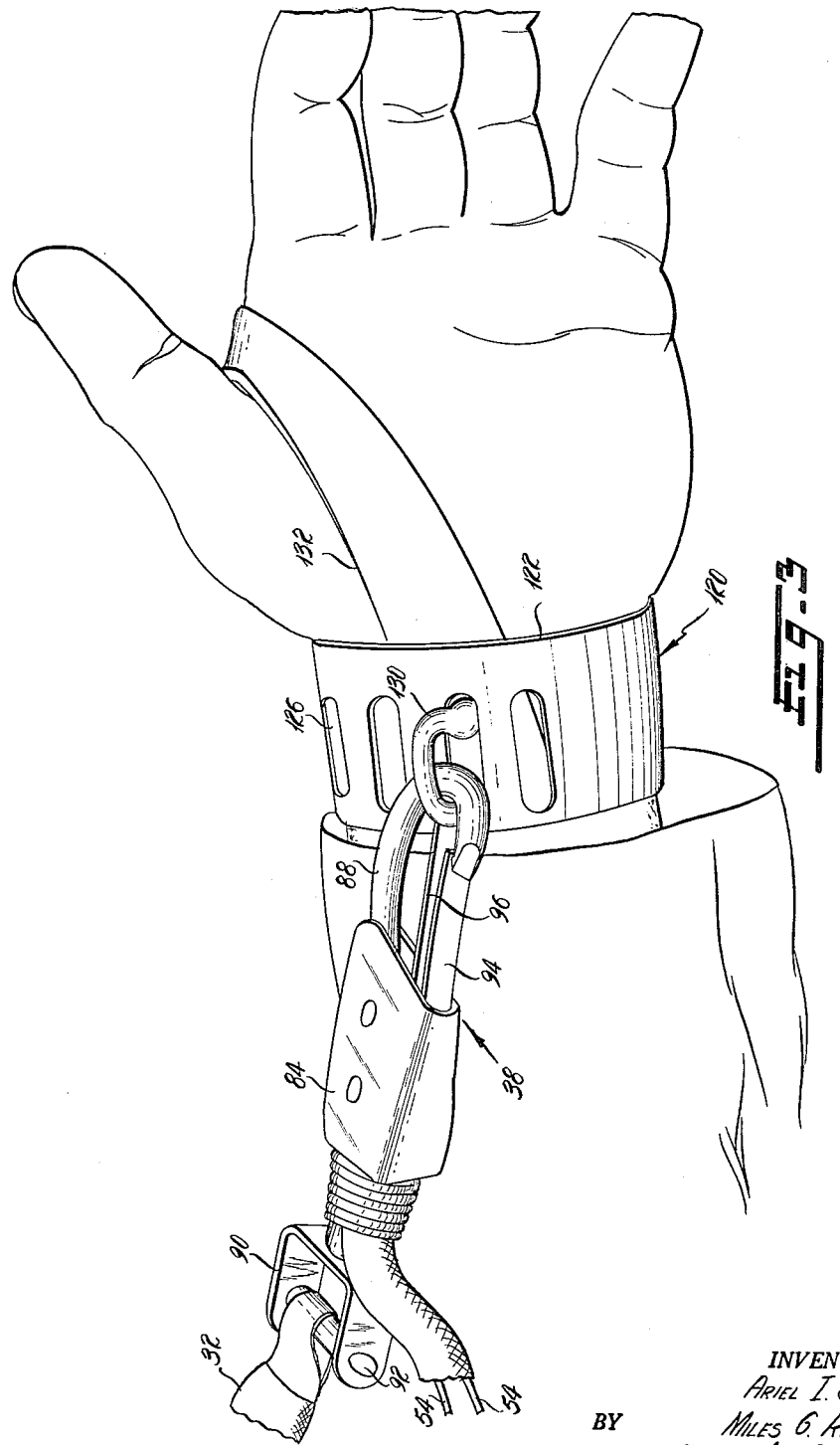

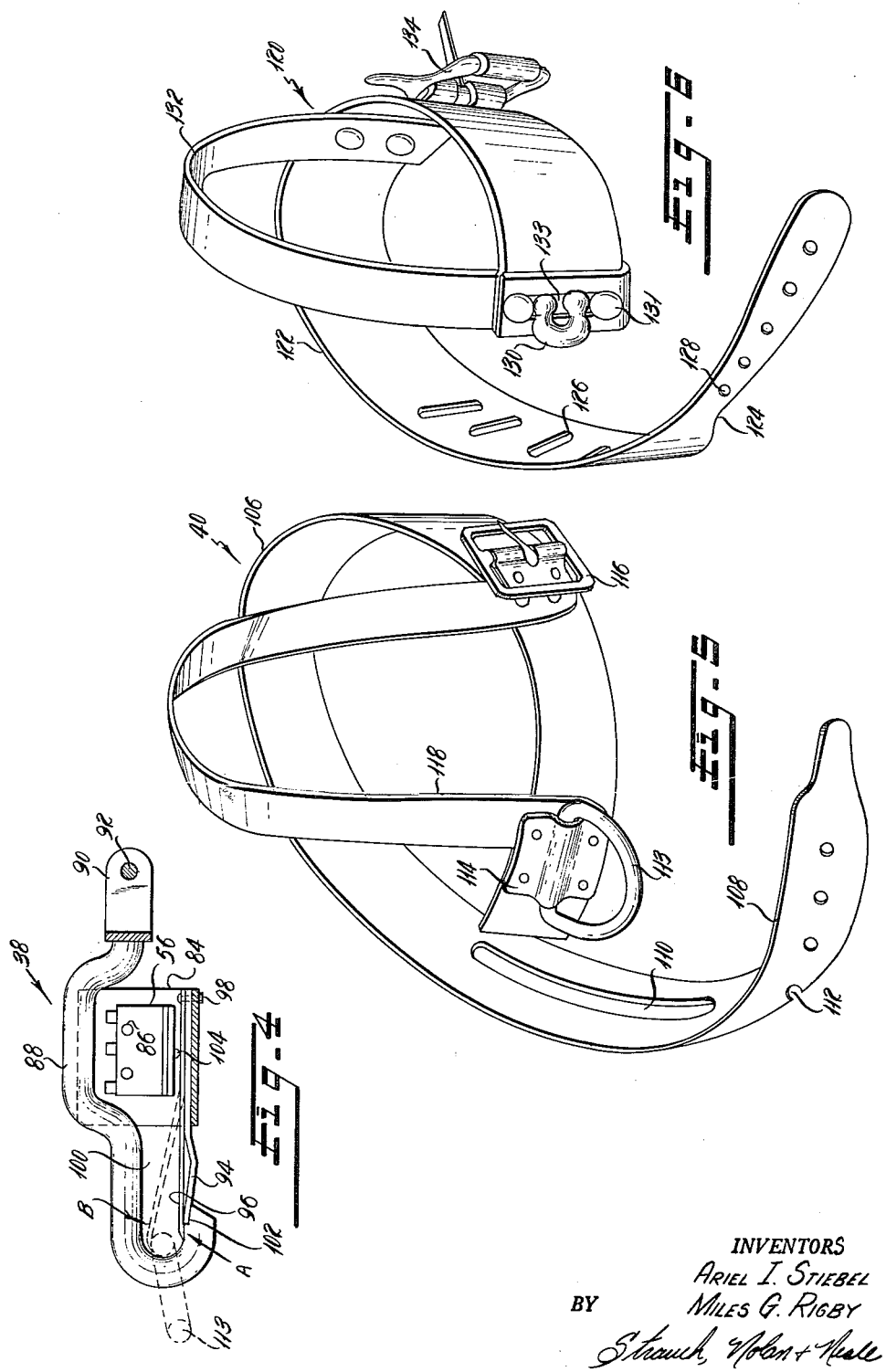

United States Patent Office 3,047,116
Patented July 31, 1962

3,047,116
SAFETY DEVICE FOR POWER PRESSES
Ariel I. Stiebel, Detroit, and Miles G. Rigby, Birmingham, Mich., assignors to Rockwell-Standard Corporation, Coraopolis, Pa., a corporation of Pennsylvania
Filed Aug. 27, 1958, Ser. No. 757,581
15 Claims. (Cl. 192—131)

This invention relates to improvements of safety devices for power machines and is more particularly concerned with an electrically operated safety device for operator-actuated power presses.

It has been proposed in the United States Letters Patent to Possons No. 1,417,346 dated May 23, 1922 that a safety pull-out guard device comprising a pair of cuff members to be worn by the operator and having cable connections between the cuff members and the movable slide of the press be employed to forcibly withdraw the operator's hands from engagement with the press to a place of safety at the proper time. This device and a great majority of similar expedients now on the market present an inherent disadvantage in that the press may be run by the operator without utilizing the protective mechanisms. Thus, the safety factor depends entirely upon the will of the operator in deciding whether or not he will make use of the device provided for his safety.

It is the primary object of the present invention, therefore, to provide an improved form of Possons' safety device whereby an electrically controlled power press or like machine is rendered inoperative whenever the safety guard cable connections are not detachably secured to the cuffs retained about the operator's wrists. Thus, where the operator has omitted attaching the cables to his safety cuffs through inadvertence or for other purposes, the machine will not operate.

In accordance with the present invention, this is accomplished by providing electrical switches in the electrical control circuit for the power press which are actuated by attaching the safety cables to the cuffs worn by the operator. These cables are connected to the cuffs in such a manner so as to prevent removal of the cuffs when the cables are secured thereto. Thus, the operator can not remove the cuffs from his wrists once the cables are in place and the machine is running. Therefore, to turn away from the machine, the operator must first detach the cables which causes the machine to stop running.

With the foregoing considerations and purposes in mind, therefore, it is a further major object of this invention to provide for a novel safety device for an operator-actuated power device which prevents the operator from running the power device without utilizing the safety device provided for his protection.

It is a further object of this invention to provide for a novel safety device for controlling an operator-actuated power press wherein the device must be operably connected to the body of the operator in order to run the press.

It is a further object of this invention to provide for a novel safety device for controlling an operator-actuated power press wherein a pair of cables are secured to a movable part of the press at one end and detachably connected at the other ends to cuffs retained about the wrists of the operator whereby the press is rendered operable and the cuffs unfastenable when the cables are attached thereto so that the hands of the operator are forcibly withdrawn from the press work area during a predetermined cycle of operation whenever the press is running.

Further objects of the invention will presently appear as the description proceeds in connection with the appended claims and annexed drawings wherein:

FIGURE 3 is a perspective view of the safety cable link-hook attached to a cuff fastened about the wrist of the operator.

FIGURE 4 is an elevation of the safety hook-link illustrated in FIGURE 3 with the side wall of the hook housing removed.

FIGURE 5 is a perspective view of a safety cuff according to one embodiment of the invention.

FIGURE 6 is a perspective view of a safety cuff according to a further embodiment of the invention.

Figure 1:
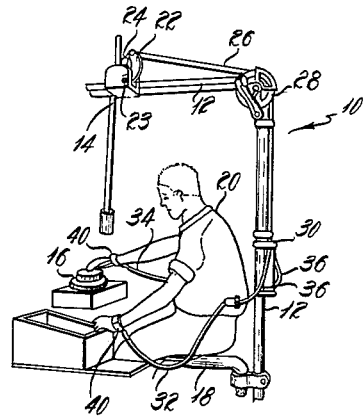
FIGURE 1 is a perspective view of a power press and the operator therefor equipped with a safety device construed in accordance with the principles of this invention and illustrating the safety device operatively attached to the body of the operator.

Referring now to the drawings, and particularly to FIGURE 1, the present invention is disclosed in connection with the safety device of the type shown in the United States Letters Patent to Possons Number 1,417,346 issued May 23, 1922 for use with a power punch press which is generally designated at 10.

This power press 10 is illustrated to comprise a stationary framework 12 built up from suitable structural forms upon which a slide ram 14 is mounted for reciprocal movement in the known manner for cooperation with the die set 16. A seat 18 is suitably secured to the framework 12 upon which the punch-press operator 20 is illustrated to be seated facing the die set 16.

A rocker arm 22 pivotally mounted on the frame 12 by pin 23 is connected to the upper portion of the slide ram 14 by link 24. Connected to the arcuately movable end of the rocker arm 22 by a pin (not shown) or other suitable means is a flexible cable 26 which passes over a pulley 28 suitably secured to the framework 12 by any suitable means (not shown) and extends down behind the operator 20 as indicated at 30. At this point, the cable 26 is branched into two parts 32 and 34, each of which trains through a respective guide tube 36 to the left and right of the operator's seat 18.

Figure 2:
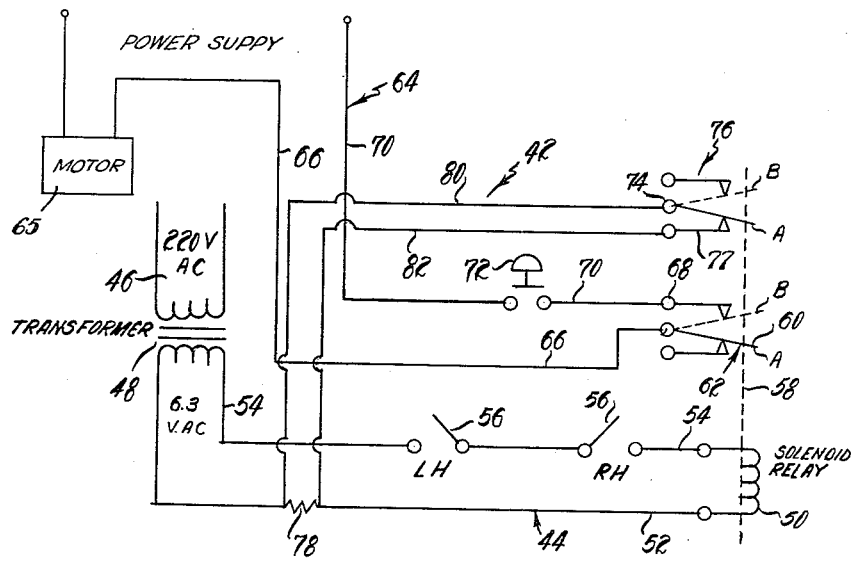
FIGURE 2 is a schematic wiring diagram of the electrical control circuit for the embodiment illustrated in FIGURE 1.

In accordance with the present invention and with reference to FIGURES 1 and 3, the cables 32 and 34 each terminate in safety hooks 38. These safety hooks 38, as will be described, are illustrated to be respectively detachably secured to wrist-cuffs 40 which are adapted to be retained about the wrists of the operator 20. It will be apparent from the foregoing that as long as the operator 20 retains the cuffs 40 about his wrists with the safety hooks 38 attached thereto, his hands will be forcibly withdrawn from the area of the die set 16 as the slide 14 descends through the corresponding movement of the rocker arm 22 which takes up on the cable 26 and its branches 30 and 32 to which the cuffs 40 are attached to shorten the free length thereof. In the safety device as disclosed in Possons' patent, the operator may allow the cuffs and/or attaching cables to hang unused and still operate the press. In order to prevent operation of the press without utilizing the Posson safety device, the present invention provides an electrical control circuit 42 (FIGURE 2) for selectively controlling the movement of the power press slide ram 14. Referring now to FIGURE 2, the electrical control circuit 42 is there illustrated to comprise a solenoid circuit 44 which derives its power from any suitable line source 46 through a transformer 48, which transformer functions to reduce the line voltage (generally 220 v.) to an acceptable control circuit voltage (generally 6 v.) and also to thereby eliminate the potential hazard of electrical shock to the operator of the press as will become apparent. A solenoid coil 50 is connected across the terminal contacts of the secondary winding of transformer 48 by conductor 52 and conductor 54. Interposed and connected in series in conductor 54 between the transformer secondary winding and the coil 50 are two spring-loaded pin actuated micro-switches 56 of any suitable type such as that disclosed in the United States Letters Patent to Kohl, No. 2,558,219, dated June 26, 1951. It will be apparent from the foregoing, that if either of the switches 56 are open, no current will pass through the solenoid 50. The armature 58 of solenoid 50 is connected to the movable contact 60 of switch 62 in the power circuit 64. The switch 62 is connected in series with a motor 65 or any other suitable electrical controlled prime mover for operating the slide 14 of the power press 10. This is accomplished by connecting the movable contact 60 of switch 62 to a suitable source of current supply by means of conductor 66 and by connecting the stationary contact 68 of switch 62 to the one leg of the motor 65 by means of conductor 70. Interposed in series with the switch 62 is a starter push button 72 for selectively operating the press motor when the solenoid circuit 44 is energized and the switch 62 is closed.

With continued reference to FIGURE 2, the solenoid armature 58 is further connected to the movable contact 74 of switch 76. This switch is connected in parallel to a resistor 78 of suitable capacity (generally 10 ohm-10 watt) by means of conductors 80 and 82 which respectively join the movable contact 74 and the stationary contact 77 of switch 76. This resistor 78 is interposed in conductor 52 in series with the coil 50 and micro-switches 56 to function to provide sufficient power to retain solenoid 50 with its armature 58 in energized position as long as both micro-switches 56 remain in closed position. The resistor with the paralleled switch 76 further functions to prevent excessive heating and potential burn-out of the coil 50 whenever a power failure or break in the transformer secondary occurs since the current is shunted through the resistor 78 whenever the coil 50 is energized.

Since the capacity of the resistor 78 is such to reduce the value of the current in the control circuit to a minimum holding current for retaining the armature 58 in energized position, it will be appreciated that any interruption in the control circuit 44 results in an immediate and positive action to de-energize the solenoid thereby interrupting the power press power circuit 64 and rendering the power press inoperative. Thus, in addition to detaching either of the safety hooks 38 from their respective wrist cuffs which opens switch 56 as will be described, the control circuit may be interrupted by a power failure, a break in the transformer coil winding 48, a break in the solenoid coil 50, a severed safety cable 32, or a break in any part of the circuit including the conductors 52 and 54, whereby the armature 58 is moved to its de-energized position immediately upon the initial drop in current to open switch 62 and de-energize the power circuit 64.

Referring now to FIGURES 3 and 4, the two micro-switches 56 are carried one by each safety hook 38 which hooks each comprise a rigid steel cage housing 84 wherein the micro-switches 56 are mounted by rivets 86 or other suitable means. These safety hooks 38 are both composed of the same identical structure so that only one will be described. Thus, with continued reference to FIGURES 3 and 4, the housing 84 is fixedly carried by an open-end rigid hook-shaped link 88 which terminates, at the far end to the hook, in a rigid U-shaped bracket 90. The brackets 90 are fixed to the respective free ends of the cable branches 32 and 34 by swivel pin members 92 or other suitable means.

With continued reference to FIGURES 3 and 4, two elongated flexible band-spring metallic arms 94 and 96 are provided, juxtapositioned one over the other. These flexible arms each are mounted near a common end to the housing 84 by rivet 98 or other suitable means to thereby extend across the space between the housing and the end of the hook-link 88 to form a closed surrounded space 100 with the housing and the hook-link. The lower flexible arm indicated at 94 has its free end carried in a notch 102 formed at the tip of the hook link 88. The upper flexible arm 96 is illustrated to have a longer free end than that of the arm 94 and is carried by the tip of the hook-link 88 immediately above the notch 102.

The upper flexible arm 96 abuts the end of the spring loaded pin 104 of micro-switch 56 so that the pin 104 is depressed to actuate the switch when the flexible arm 96 is deflected inwardly to a position indicated at B.

Referring now to FIGURE 5, the cuff 40 to which the safety hook 38 is detachably secured, as will presently become apparent, is illustrated to comprise a wrist band 106 of suitable tanned or processed hide terminating at one end in a fastener strap 108, which strap is formed with a longitudinal elongated slot 110 and a series of aligned buckle apertures 112 adjacent to slot 110. At the other end of the band 106, a rigid ring-shaped staple 113 is pivotally secured to the outward face of the band by any suitable means such as strap member 114 which may be suitably stitched or otherwise riveted to band 106. Intermediate the ends of band 106, a suitable buckle 116 is secured to the outward side thereof by stitchwork or other suitable means. The cuff 40 further is provided with a cross strap 118 arcuately looped over the band 106 and having its ends fixed to the band 106 by stitching or other suitable means.

In assembled relation on the operator's wrist, the band 106 of cuff 40 is arcuately wrapped around the wrist so that the terminal fastener strap portion 108 overlaps the staple end of the band. The staple 113 projects through the elongated slot 110 and the strap portion is fastened to the buckle 116 by means of one of the series of apertures 112. The cross strap 118 fits into the crevice between the thumb and forefinger (FIGURE 3) of the operator's hand. To provide for adjustability of the band to firmly fit and conform to the wrist of a variety of operators, the slot 110 is formed to have a substantially greater length than the chord length of the staple 113. The diameter of the band may thereby be adjusted by selecting the proper aperture 112 in which to fasten the buckle.

Referring now to FIGURE 6, a further embodiment of the wrist cuff is illustrated therein and generally designated at 120. This cuff 120, similar to the cuff illustrated in FIGURE 5 comprises a wrist band 122 of suitable tanned or processed hide terminating at one end in a fastener strap 124, which strap is formed with a series of aligned elongated slots 126 extending transversely to the length of the strap and a series of aligned buckle apertures 128 adjacent to the series of slots 126. At the other end of the band 122, a rigid teardrop shaped staple 130 is secured to the outward side of the band by copper rivets 131 or other suitable means. A cross strap 132 arcuately loops over band 122, having its associated ends single folded from the underside of band 122 and fastened to the outward side thereof by stitching, riveting or other suitable means. The staple end of cross strap 132 is provided with an elongated slot 133 through which the staple 130 projects. Intermediate the ends of band 122 on the outward side thereof, a suitable buckle 134 is secured by stitching or other suitable means.

In assembled relation on the operator's wrist, the band 122 is arcuately wrapped around the wrist so that the terminal fastener strip 124 overlaps the staple end of the band (FIGURE 3). The staple 130 projects through a chosen elongated slot 126 depending upon the size of the operator's wrist and the strap portion is fastened to the buckle by means of a suitable one of the series of apertures 128 so that the band fits snugly about the operator's wrist. The cross strap 132, similar to the embodiment illustrated in FIGURE 5, fits between the crevice formed by the thumb and the fore-finger of the operator's hand (FIGURE 3).

In operation, the operator fastens the cuffs 40 or 120 about his wrists in the manner hereinbefore described. In order to actuate the micro-switches 56 carried by the safety hooks 38 and thereby energize the solenoid control circuit 44, the operator then detachably secures the safety hooks 38 to their associated staples 113 (FIGURE 5) fixed on cuffs 40 or to the staples 130 of cuffs 120 (FIGURE 6) where desired. By inserting the staple 113 (FIGURE 5) or 130 (FIGURE 6) into the space 100 both flexible arms 94 and 96 are deflected inwardly. The staple passes around the free end of the shorter lower arm 94 thus permitting this arm to deflect back to its original position indicated at A (FIGURE 4) thus locking the staple around the hook 88 in space 100. The upper flexible arm 96 is deflected by the staple 113 (130, FIGURE 6) from its undeflected position indicated at A to an inwardly deflected position indicated at B where it is held by staple 113 (130, FIGURE 6).

As will be apparent from the foregoing, by attaching the safety hooks 38 to the cuff staples 113 (FIGURE 5) or 130 (FIGURE 6), the operator is unable to unfasten the cuffs and remove them from his wrists as the safety hook when so attached precludes the band 106 (FIGURE 5) or 122 (FIGURE 6) from being unwrapped.

When each upper arm 96 of the respective hooks 38 is moved to its inward deflected position indicated at B, FIGURE 4, by inserting the staple into the space 100, the spring loaded pin 104 of micro-switch 56 is depressed by the deflection of the arm, thereby actuating its respective switch to a circuit closing position. Thus by attaching the safety hooks 38 to their respective cuff staples 113 (FIGURE 5) or 130 (FIGURE 6), the associated micro-switches 56 are actuated and solenoid 50 in circuit 44 is energized.

When solenoid 50 is energized, the movable contact 60 is shifted by armature 58 to close switch 62. The operator 20 may now selectively operate the power press 10 by manipulating the starter push button 72 which completes the power circuit 64 to the power press motor (not shown) or other electrically controlled prime mover. When the press is actuated by the depression of the push button 72 by the operator, the hand withdrawing safety device will function to remove the operator's hands from the path of the slide ram 14.

If for any reason the operator desires to leave the press, he must initially unhook the safety hooks 38 from cuffs 40 which causes the respective flexible arms 96 to return to the position indicated at A. This serves to open the switches 56 and de-energize coil 50 which in turn de-energizes the power circuit 64 by opening switch 76. Similarly, where the operator omits to attach the safety hooks 38 to the cuffs 40 (FIGURE 5) or 120 (FIGURE 6), it will be apparent that the press cannot be rendered operable consequently requiring the operator to attach the safety device before he can actuate the prime mover for the slide ram 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a safety device for an operator-actuated power press having movable parts, a pair of flexible cuff members having free terminal ends, fastener means associated with each of said cuff members for detachably retaining said cuff members arcuately about the wrists of the operator, said cuff members having a slotted section intermediate the terminal ends thereof, a staple member joined to each of said cuff members for projection through its associated slotted section in assembled relation on the wrist of the operator, electrical circuit means for selectively controlling the movement of said movable press parts including at least one circuit energizing electrical switch and means cooperating with said staple members for simultaneously actuating said electrical switch and for rendering said cuff members unfastenable in assembled relation about the operator's wrist comprising detachable cable fastener hooks having an open end for receiving respective ones of said staple members projecting through its associated slotted section in assembled relationship on the wrist of the operator, a flexible arm rigidly secured to each of said cable fastener hooks and extending across said open end of associated ones of said hooks, said arm being movable by respective ones of said staple members in assembled relation to actuate said switch to circuit energizing position to permit movement of said parts.

2. In a safety device for an operator-actuated power driven machine having a movable work forming element, a pair of flexible cuffs each having free terminal ends, fastener means individual to each of said cuffs and connected thereto for detachably retaining said cuffs arcuately about the wrists of the operator, said cuffs having an intermediate slotted section each overlapping a terminal end of its associated cuff in assembled relationship, staple members joined to respective ones of said cuffs for projection through respective ones of said overlapping slotted sections in assembled relationship on the wrists of said operator, a pair of flexible cable connection units responsive to the movement of an operator of said machine to a place of safety during movement of said work forming element in a predetermined direction, each of said cable connection units terminating at its free end in a detachable hook shaped fastener for attachment to respective ones of said staple members in assembled relationship to render said cuffs unfastenable, electrical circuit means for selectively controlling the movement of said work forming element including a pair of circuit energizing electrical switches connected in series, and means carried by said cable connection units independent of said cuffs for actuating said switches and operable to actuate said switches to circuit energizing position for permitting movement of said work forming element by detachably securing said hook shaped fasteners to said staples.

3. In the safety device defined in claim 2 wherein said electrical switch actuating means comprises a pair of flexible arms, each rigidly secured near one end to respective ones of said hook-shaped fasteners to extend freely across the open end thereof, said arms being movable to a switch actuating position by respective ones of said staple members when said hook-shaped fasteners and said staple members are in assembled relation.

4. In the safety device defined in claim 3 wherein said hook-shaped fasteners each comprise a housing, an open-end hook-shaped link, an elongated flexible strip secured near one end thereof in said housing and extending across the open end of said hook-shaped link whereby said strip is deflected by its associated staple member when respective ones of said hook-shaped link are attached thereto, said staple members passing around the free end of respective ones of said flexible strips thereby permitting said flexible strips to return to its undeflected position for locking said staple members in assembled relation with respective ones of said hook-shaped fasteners.

5. In the safety device defined in claim 3 wherein said electrical switches comprise a microswitch mounted in respective ones of said hook-shaped fasteners said microswitches having spring loaded pins for actuating said switches, said spring loaded pins being operatively connected to respective ones of said flexible arms for movement therewith whereby inward movement of said flexible arms by its associated staple member actuates repective ones of said microswitch to energize said electrical circuit means.

6. In the safety device defined in claim 2 wherein said electrical circuit means further comprises power circuit means for actuating said power press, contact means for interrupting said power circuit means, and electrically operated means for actuating said contact means comprising a solenoid in series circuit relationship with said switches whereby said solenoid is energized by said switches, and holding circuit means for maintaining said solenoid energized with a minimum holding current.

7. In the safety device defined in claim 2 wherein each of said strap fasteners form a series of substantially parallel slots transverse to the length of said associated cuff and wherein said associated staple member is selectively projected through one of said slots thereby adjusting said cuff in assembled relation to fit the size of the wrist of said operator.

8. In the safety device defined in claim 2 wherein each of said slotted strap fasteners form an elongated slot substantially parallel with the length of said associated cuff, said slot being of substantially greater length than said associated projecting staple member whereby said staple member is selectively projected through a portion of said slot for adjusting said cuff in assembled relation to fit the size of the wrist of said operator.

9. In a power driven machine having a movable work forming element and power means for driving said work forming element, the improvement of: a safety device responsive to the movement of said work forming element for forcibly withdrawing the hands of an operator to a place of safety during movement of said work forming element in a predetermined direction comprising flexible motion transmitting cable means movable in response to the movement of said work forming element, a pair of wrist cuffs adapted to be removably fastened about the wrists of the operator, hook means adapted to be detachably latched to said cuffs for detachably securing said motion transmitting cable means thereto, means for preventing said cuffs from being unwrapped when said motion transmitting cable means are secured to said cuffs by said hook means, and electrical circuit means for controlling the operation of said power means and including at least one electrical circuit energizing switch actuatable to circuit energizing position by latching said hook means to said cuffs to thereby energize said power means for driving said work forming element.

10. The power driven machine as defined in claim 9 wherein said hook means includes means housing and supporting said switch independently of said cuffs.

11. In a safety device for use in a power-driven machine having a power supply means and a work forming element movable by power delivered from said power supply means, comprising a pair of cuffs adapted to be removably fastened about the wrists of an operator for said machine, safety connection means detachably secured to said cuffs and responsive to the movement of said work forming element in a predetermined direction for forceably withdrawing the hands of the operator to a place of safety, and electrical circuit means including at least one electrical switch carried by said safety connection means independently of said cuffs and actuatable to render said power means inoperable to deliver power to move said work forming element whenever said safety connection means are detached from said cuffs.

12. In a safety device for use in a power-driven machine having a power supply means and a work forming element movable by power delivered from said power supply means, comprising a pair of cuffs adapted to be wrapped and removably retained about the wrists of an operator for said machine, flexible cable connection means detachably latched to said cuffs and responsive to the movement of said work forming element for withdrawing the hands of the operator to a place of safety, means for rendering said cuffs unfastenable from the wrists of the operator whenever said cable connection means are latched thereto, and means for controlling said power supply means and including at least one electrical switch carried by said cable connection means and actuatable to a position to render said power supply means inoperable to deliver power to said work forming element by unlatching said cable connection means from said cuffs.

13. The safety device as defined in claim 12 wherein means are provided for adjusting said cuffs to snugly fit the size of the wrists of the operator.

14. The safety device as defined in claim 12 wherein said cable connection means comprises a flexible cable for each of said cuffs adapted to be connected to a movable part of said machine for movement therewith so that the effective free length of said cable is varied by the movement of said movable part, and a cable fastener hook fixedly secured to the free end of said cable for removable attachment to its associated cuff and including a casing enclosing said switch and an actuating member operable to control said switch.

15. The safety device as defined in claim 14 wherein said means for rendering said cuffs unfastenable includes a member for latchably engaging said fastener hook and moving said actuating member.

References Cited in the file of this patent
UNITED STATES PATENTS

| 2,013,441 | Goff et al. | Sept. 3, 1935 |
| 2,978,084 | Vilkaitis | Apr. 4, 1961 |